US 8,387,046 B1

(12) United States Patent
Montague et al.

(10) Patent No.: US 8,387,046 B1
(45) Date of Patent: Feb. 26, 2013

(54) SECURITY DRIVER FOR HYPERVISORS AND OPERATING SYSTEMS OF VIRTUALIZED DATACENTERS

(75) Inventors: Bruce Montague, Santa Cruz, CA (US); Sanjay Sawhney, Cupertino, CA (US); Matthew Conover, East Palo Alto, CA (US); Tzi-cker Chiueh, Setauket, NY (US)

(73) Assignee: Symantec Corporation, Mountain View, CA (US)

( * ) Notice: Subject to any disclaimer, the term of this patent is extended or adjusted under 35 U.S.C. 154(b) by 1004 days.

(21) Appl. No.: 12/411,628

(22) Filed: Mar. 26, 2009

(51) Int. Cl.
*G06F 9/00* (2006.01)

(52) U.S. Cl. ............................................ 718/1; 713/164

(58) Field of Classification Search .................. None
See application file for complete search history.

(56) References Cited

U.S. PATENT DOCUMENTS

| | | | |
|---|---|---|---|
| 6,857,059 B2 | 2/2005 | Karpoff et al. | |
| 6,898,670 B2 | 5/2005 | Nahum | |
| 6,934,799 B2 | 8/2005 | Acharya et al. | |
| 7,007,147 B2 | 2/2006 | Eguchi et al. | |
| 7,093,086 B1 | 8/2006 | van Rietschote | |
| 7,386,662 B1 | 6/2008 | Kekre et al. | |
| 7,484,245 B1 * | 1/2009 | Friedman et al. | 726/27 |
| 7,797,748 B2 * | 9/2010 | Zheng et al. | 726/24 |
| 7,865,908 B2 * | 1/2011 | Garg et al. | 719/321 |
| 7,917,481 B1 * | 3/2011 | Kale et al. | 707/693 |
| 8,079,030 B1 * | 12/2011 | Satish et al. | 718/1 |
| 8,104,083 B1 * | 1/2012 | Sobel et al. | 726/17 |
| 2005/0235123 A1 * | 10/2005 | Zimmer et al. | 711/170 |
| 2008/0005791 A1 * | 1/2008 | Gupta et al. | 726/15 |
| 2008/0184218 A1 * | 7/2008 | Largman et al. | 717/168 |

OTHER PUBLICATIONS

Microsoft, "Virtualization for Windows: A Technology Overview," David Chappell, Chappell & Associates, Jul. 2007.
Microsoft, "Windows Server Virtualization—An Overview," May 2006.
Virtualization from the Datacenter to the Desktop,"Building a Comprehensive, end-end virtualization strategy," 2007 Core Infrastructure Optimization, Microsoft Corporation 2007.
U.S. Appl. No. 11/009,108, filed Dec. 10, 2004.
"What is Volume Shadow Copy Service," Microsoft Corporation, 2004, 5 pages.

* cited by examiner

*Primary Examiner* — Eric Coleman
(74) *Attorney, Agent, or Firm* — Rory D. Rankin; Meyertons, Hood, Kivlin, Kowert & Goetzel, P.C.

(57) ABSTRACT

A system and method for efficient security protocols in a virtualized datacenter environment are contemplated. In one embodiment, a system is provided comprising a hypervisor coupled to one or more protected virtual machines (VMs) and a security VM. Within a private communication channel, a split kernel loader provides an end-to-end communication between a paravirtualized security device driver, or symbiont, and the security VM. The symbiont monitors kernel-level activities of a corresponding guest OS, and conveys kernel-level metadata to the security VM via the private communication channel. Therefore, the well-known semantic gap problem is solved. The security VM is able to read all of the memory of a protected VM, detect locations of memory compromised by a malicious rootkit, and remediate any detected problems.

17 Claims, 7 Drawing Sheets

SECURITY DRIVER FOR HYPERVISORS AND OPERATING SYSTEMS OF VIRTUALIZED DATACENTERS

BACKGROUND OF THE INVENTION

1. Field of the Invention

This invention relates to computing systems, and more particularly, to efficient security protocols in a virtualized datacenter environment.

2. Description of the Relevant Art

As computer performance increases for both desktops and servers, it becomes more desirable to efficiently utilize the available high performance. Multiprocessing is one technique that enables several software applications to share a multi-core processor or even a multi-threaded core. With these techniques a general-purpose operating system (OS) has control of a system's physical resources, such as allocation of the physical resources and management of external storage. Further techniques such as virtual memory and I/O device abstraction support the illusion that each software application controls all physical resources, or even more resources than are physically available.

Additional techniques involving virtualization have proved to be a powerful technology to simplify software development and testing, to enable server consolidation, and to enhance datacenter agility. Virtualization broadly describes the separation of a service request from the underlying physical delivery of that service. A software layer, or virtualization layer, may be added between the hardware and the OS. In one instance, this software layer runs on top of a host OS and spawns higher level virtual machines (VMs). This software layer monitors corresponding VMs and redirects requests for resources to appropriate application program interfaces (APIs) in the hosting environment. This type of software layer is referred to as a virtual machine monitor (VMM).

In another instance, a software layer runs directly on the hardware without the need of a host OS. This type of software layer, or type of VMM, is referred to as a hypervisor. Although a hypervisor is a software layer, to be effective this layer may need hardware assistance. Privileged and sensitive calls within a corresponding OS may be set to automatically trap to the hypervisor, removing a requirement for binary translation.

Analogous to a general-purpose OS, presenting the appearance to multiple software applications that each application has unrestricted access to a set of computing resources, a VMM manages a computer's, or a machine's, physical resources and presents these resources to one or more VMs. This method creates an illusion for an OS within each VM that the OS has full access to the physical resources that have been made visible. Such an approach allows for time-sharing a single computer between several single-tasking OSes.

Fully abstracting the OS and applications from the hardware and encapsulating them into portable VMs has enabled virtual infrastructure features generally not possible with hardware alone. For example, servers may run in extremely fault tolerant configurations on a virtual infrastructure with no downtime needed for backups or hardware maintenance. A datacenter, which also may be referred to as a server room, is a centralized repository, either physical or virtual, for the storage, management, and dissemination of data pertaining to one or more businesses. Increasingly, datacenters are demanding rapid adaptability, requiring a single server to run one operating system for a period of time then be quickly redeployed to run another operating system serving a different purpose. Virtual machines may be used to provide this resource management capability.

There are several approaches to performing virtualization. However, virtualizing the x86 processor architecture is not straightforward, since this architecture originally did not support a set of conditions to efficiently support system virtualization, such as the Popek and Goldberg virtualization requirements set forth in the 1974 article Gerald J. Popek and Robert P. Goldberg (1974), "Formal Requirements for Virtualizable Third Generation Architectures", Communications of the ACM 17 (7): pp. 412-421. These types of virtualization are part of a developing field, which has potential security issues with guest OS cache data and unauthenticated connections.

Enterprise hypervisors are currently one of the most volatile areas of the industry. Security products in these virtualized environments need to support OSes in many different hypervisor guests and it is common for enterprise datacenters to require support for both 64-bit and 32-bit VMs. Currently, specific security resources, such as threat signatures, may often be different on different OSes. However, it is desirable to have a single underlying infrastructure providing common security operations on different OSes, such as memory or filesystem scanning and process management. A single infrastructure may avoid the need to build unique security systems for each OS or hypervisor, or for each combination of a matrix of N×N combinations of operating systems and hypervisors.

Further, while hypervisors may enable moving security functions out from within general VMs to external entities, such externally based approaches may suffer from a "semantic gap" problem. A semantic gap problem may exist due to the external entity not having the native contextual view that an internally based entity may have. Useful security solutions require run-time knowledge of both OS and kernel internal operations, such as process data structures, sockets, files, and so forth, to perform meaningful remediation, behavior analysis, and false positive analysis. Unfortunately, kernel-formulated semantics is generally only accessible via the kernel itself.

In view of the above, efficient methods and mechanisms for efficient security protocols in a virtualized datacenter environment are desired.

SUMMARY OF THE INVENTION

Systems and methods for efficient security protocols in a virtualized datacenter environment are contemplated.

In one embodiment, a system is provided comprising a hypervisor coupled to one or more protected virtual machines (VMs), each protected VM comprising a guest operating system (OS). A security VM is coupled to the protected VMs via a private communication channel. Within this channel, a split kernel loader provides an end-to-end communication between a front-end and a back-end. The front-end consists of a paravirtualized security device driver, or "symbiont", for each said guest OS. The back-end consists of the security VM.

In one embodiment, the symbiont comprises kernel instructions loaded into a kernel of each protected VM. The symbiont sets up a private communication channel, monitors kernel-level activities of a corresponding guest OS, and conveys information regarding the kernel-level metadata to the security VM via the private communication channel. In response to the information, the security VM is able to read the memory of a protected VM, detect locations of memory compromised by, for example, a malicious rootkit, and remediate any detected problems.

These and other embodiments will become apparent upon reference to the following description and accompanying drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

A datacenter is a centralized repository, either physical or virtual, for the storage, management, and dissemination of data pertaining to one or more businesses. Also, a datacenter may act as a restricted access area containing automated systems that constantly monitor server activity, Web traffic, and network performance. Increasingly, datacenters demand rapid adaptability, requiring a single server to be configured to run multiple operating systems (OSes), each for a different purpose.

Figure 1:
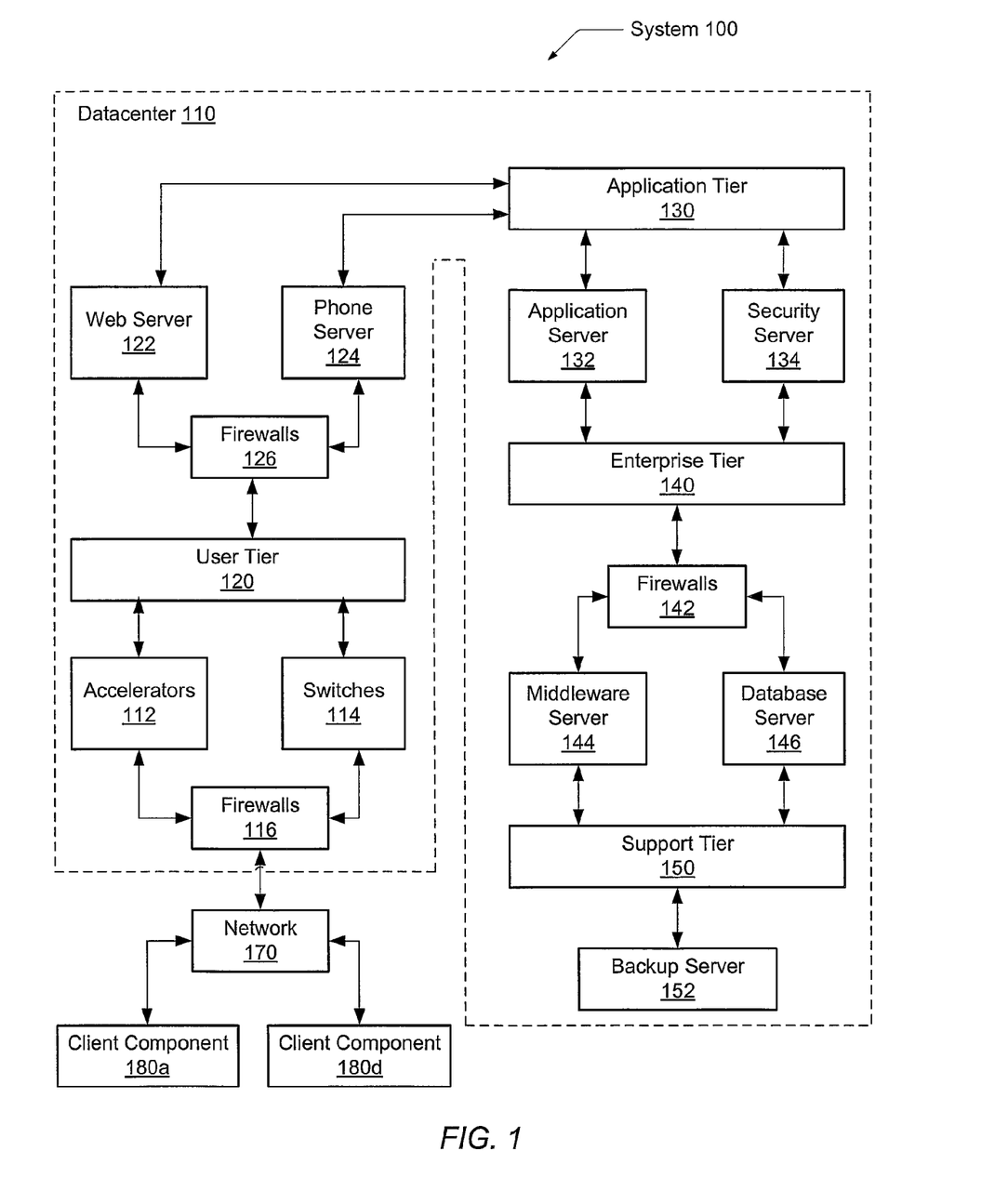
FIG. 1 is a generalized block diagram illustrating one embodiment of a computing system with a datacenter.

Referring to FIG. 1, one embodiment of a computer system 100 with a datacenter is shown. In the example shown, any number and different types of client components 180a-180d may be coupled to one another and to datacenter 110 via a network 170. As used herein, elements referred to by a reference numeral followed by a letter may be collectively referred to by the numeral alone. For example, client components 180a-180d may be collectively referred to as client components 180. Client components 180 may include personal desktop computers, workstations, servers, phone and wireless service providers, an intranet, laptops, smartphones, personal digital assistants (PDAs), or other.

Client components 180 may be coupled to network 170 by a variety of techniques including wireless connection, direct local area network (LAN) connections, wide area network (WAN) connections such as the Internet, a router, and others. Network 170 may comprise one or more LANs that may also be wireless. Network 170 may further include remote direct memory access (RDMA) hardware and/or software, transmission control protocol/internet protocol (TCP/IP) hardware and/or software, router, repeaters, switches, grids, and/or others.

In one embodiment, datacenter 110 may include a top-level architecture of multiple physical tiers, wherein each tier includes connection protocols such as a LAN and separates different groups of hardware component and their subactivities. For example, datacenter 110 has a user tier 120, an application tier 130, an enterprise tier 140, and a support tier 150. In alternate embodiments, one or more of these tiers and corresponding hardware components may be combined and other ones added.

In one embodiment, network 170 may be coupled to datacenter 110 via one or more firewalls 116 to prevent network intrusion to the internal network. One or more dedicated appliances or software applications may be included in firewalls 116 to inspect and regulate traffic flow through it. Beyond firewalls 116 may be one or more hardware components such as web accelerators 112 and switches and load balancers 114. Although not shown, in addition, file servers, worker workstations, and other hardware components may be included.

Between application tier 130 and user tier 120 may be included one or more web servers 122, phone servers 124, additional firewalls 126, email servers, content management servers, or other. Between enterprise tier 140 and application tier 130 may be included one or more application servers 132, security servers 134, gateway servers, report servers, security database, operator workstations, additional firewalls, or other. Between support tier 150 and enterprise tier 140 may be included one or more middleware servers 144, database servers 146, additional firewalls 142, legacy servers, printer servers, or other. Finally, a support tier 150 may be additionally coupled to a backup server 152 that may include a computer with hardware and software optimized for its intended purpose of data storage. Large disk drives, powerful fans, specialized uninterruptible power supplies, and so on may be used. Additionally, disk and tape libraries may be utilized.

Much like virtualization is used in desktops and servers to fully or partially decouple software, such as an OS, from a system's hardware and provide an end-user with an illusion of multiple OSes running on a same machine each having its own resources, the idea of virtualization may be expanded to datacenters.

In one embodiment, datacenter 110 may be modeled as a grid and each client device 180, or each customer, may have an illusion of being supplied with a dedicated grid, or virtual datacenter with the resources of datacenter 110. In another embodiment, datacenter 110 may have all or almost all machines running hypervisors, and thus, all software of interest runs in VMs. Therefore, powerful VM features, such as live-migration, may be used with respect to any software running in the datacenter. These two types of datacenters are not mutually exclusive. A user of a pay-as-you go "virtualized datacenter", might see a set of VMs that form a "virtual datacenter".

A virtual datacenter appears as an entire "virtual grid" to an end-user. Virtual datacenters may provide the same kinds of tools that are already familiar to datacenter and server operators. Advantages of virtual datacenters and virtualized datacenters include self-service, pay-as-you-go, and scalability. In one embodiment, each virtual datacenter, or grid, may be hosted in isolation from other customers. A virtual datacenter may be similar to a traditional datacenter whereby all of the regular components are supplied such as hardware firewalls, hardware load balancers, network storage, virtualized servers, dedicated networks (VLANs), and the option for physical servers for workloads that should not be virtualized.

A physical server with several virtual machines running on it, such as 50 VMs, in one embodiment, may utilize virtualization. For example, referring to FIG. 2, one embodiment of a virtualization scheme 200 utilizing binary translation is shown. In one embodiment, a server has hardware resources, such as computer system hardware 202. This hardware 202 may include typical computer hardware such as one or more processors, each with one or more processing cores, a memory hierarchy with different levels of caches, logic for system bus management or packet processing, interfaces for peripherals, and so forth.

Figure 2:
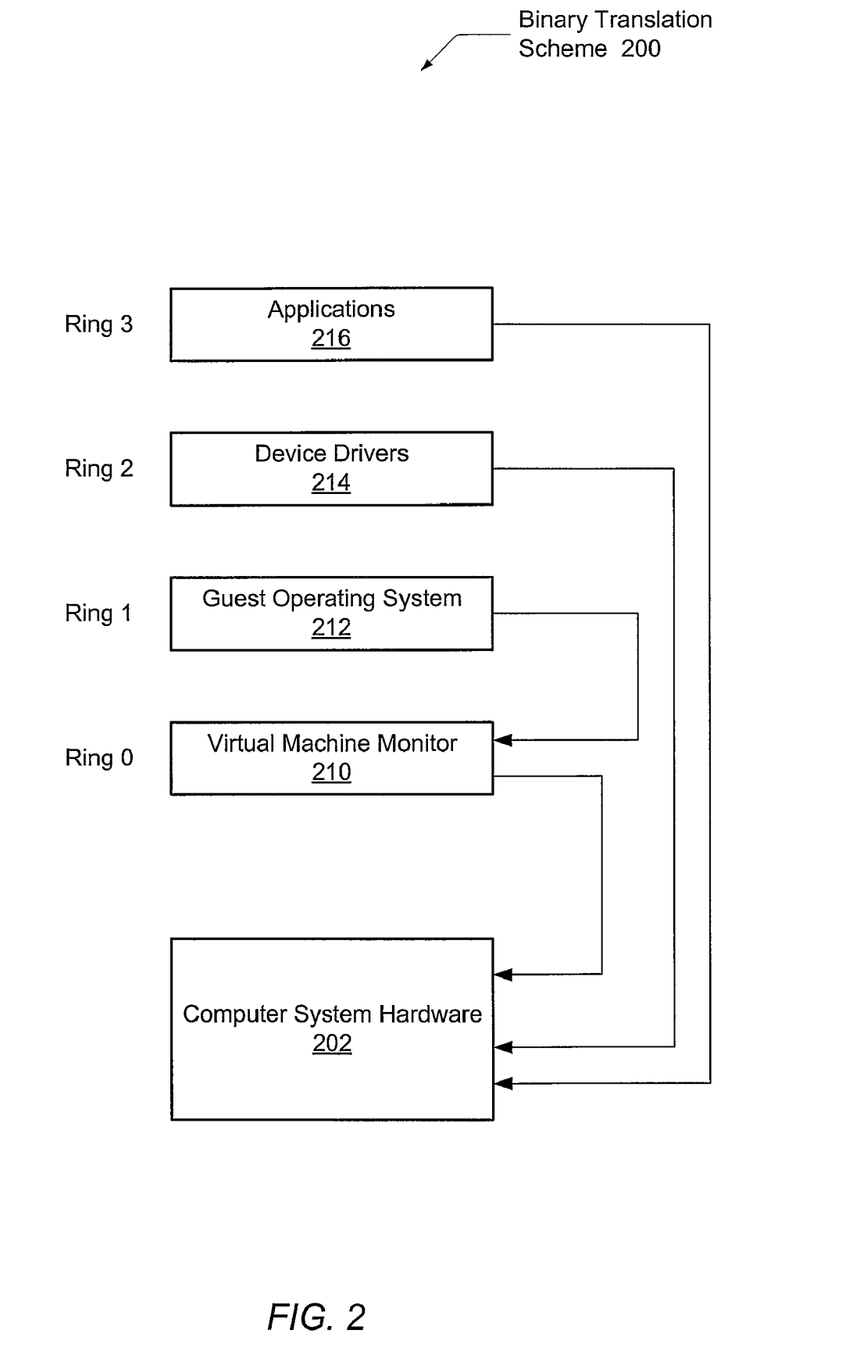
FIG. 2 is a generalized block diagram illustrating one embodiment of a virtualization scheme utilizing binary translation.

In one embodiment, protection rings, such as Ring 0 to Ring 3, provide different levels of access to resources in order to protect data and functionality from faults and malicious behavior. Rings are arranged in a hierarchy from most privileged (most trusted, usually numbered zero) to least privileged (least trusted, usually with the highest ring number). Ring 0 may be the level with the most privileges and interacts directly with the physical hardware such as a processor core and memory.

A binary translation technique may utilize a host architecture approach that installs and runs a virtualization layer, such as virtual machine monitor (VMM) 210, as an application on top of an OS, such as guest OS 212. This approach may translate kernel code to replace non-virtualizable instructions, which may be a part of an x86 architecture, with new sequences of instructions that have the intended effect on virtual hardware.

As can be seen in FIG. 2, in one embodiment, VMM 210 occupies the highest privilege ring, Ring 0, normally reserved for an OS. The guest OS 212 is moved to Ring 1. The guest OS 212 is not aware it is being virtualized and requires no modification. The VMM 210 translates all OS instructions on the fly and caches the results for future use, while user-level instructions from applications 216 run unmodified at native speed.

User-level code is directly executed on the processor for high performance virtualization. The combination of binary translation and direct execution fully decouples the guest OS 212 from the underlying hardware 202. This type of virtualization may require no hardware assisted mechanisms or modified OS (paravirtualization) mechanisms to virtualize sensitive and privileged instructions. Device drivers 214 may have a privilege level denoted by Ring 2, such as being able to turn on a web camera without notifying an end-user, or other.

Figure 3:
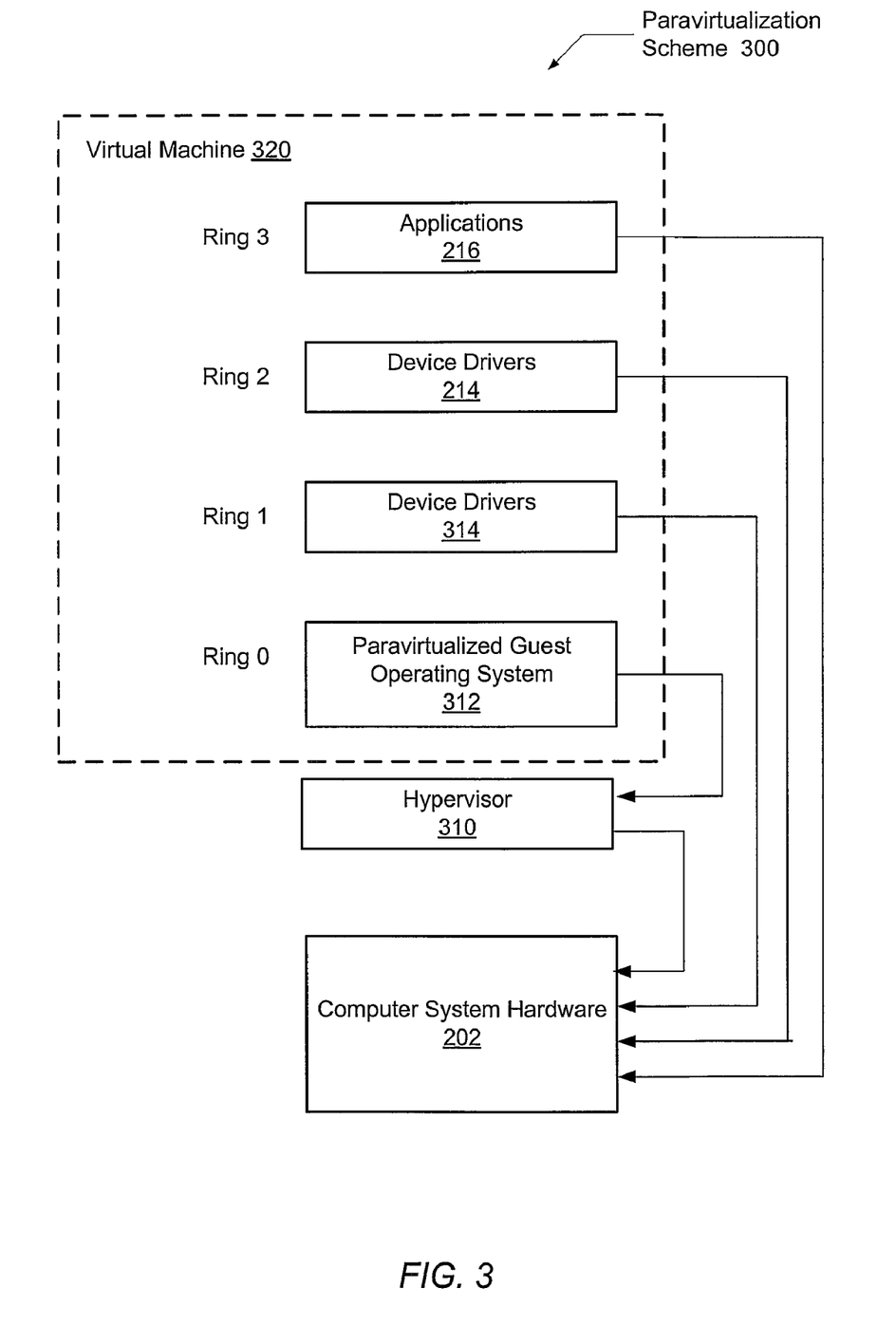
FIG. 3 is a generalized block diagram illustrating one embodiment of a paravirtualization scheme.

Turning now to FIG. 3, one embodiment of a paravirtualization scheme 300 is shown. Circuitry, signals, logic, and computer program instructions corresponding to those in FIG. 2 are numbered accordingly. In one embodiment, a server has hardware resources, such as computer system hardware 202. Virtualization may utilize a combination of hyper calls and direct execution techniques. This virtualization approach utilizes a hypervisor architecture approach that installs a virtualization layer, such as hypervisor 310, directly on the hardware of a system, such as computer system hardware 202. In one embodiment, hardware 202 comprises an x86 architecture. Hypervisor 310 is a type of virtual machine monitor (VMM) that runs directly on hardware, rather than on top of an OS. Hypervisor 310 provides each virtual machine with all the services of the physical system, including virtual basic-input-output-software (BIOS), virtual peripheral devices, and virtualized memory management. Examples of hypervisor 310 include VMware ESX, Xen, KVM, Hyper-V, and Windows virtualization.

Since hypervisor 310 has direct access to the resources of hardware 202 rather than going through an OS, hypervisor 310 may be more efficient than a hosted architecture. Virtualization scheme 300 involves modifying the kernel of paravirtualized guest OS 312 to replace non-virtualizable instructions, which may be a part of an x86 architecture, with hypercalls that communicate directly with hypervisor 310. The hypervisor 310 may also provide hypercall interfaces for other critical kernel operations such as memory management, interrupt handling, and time keeping.

Virtualization scheme 300 requires modifications to the paravirtualized guest OS 312 that executes on a virtual machine. As a result a paravirtualized guest OS 312 is aware that it is executing on a VM. The paravirtualized guest OS 312, device drivers 314 and 214, and applications 216 make up a virtual machine 320. Multiple virtual machines (VMs) 320, such as 20 to 30 VMs in one embodiment, may run on hypervisor 310. In addition to the VMs 320, an administrative OS and/or management console may also run on top of the hypervisor 310 in order to allow the VMs 320 to be managed by a system administrator. Hypervisor based virtualization solutions include Xen, VMware ESX Server and Microsoft's Hyper-V technology.

Figure 4:
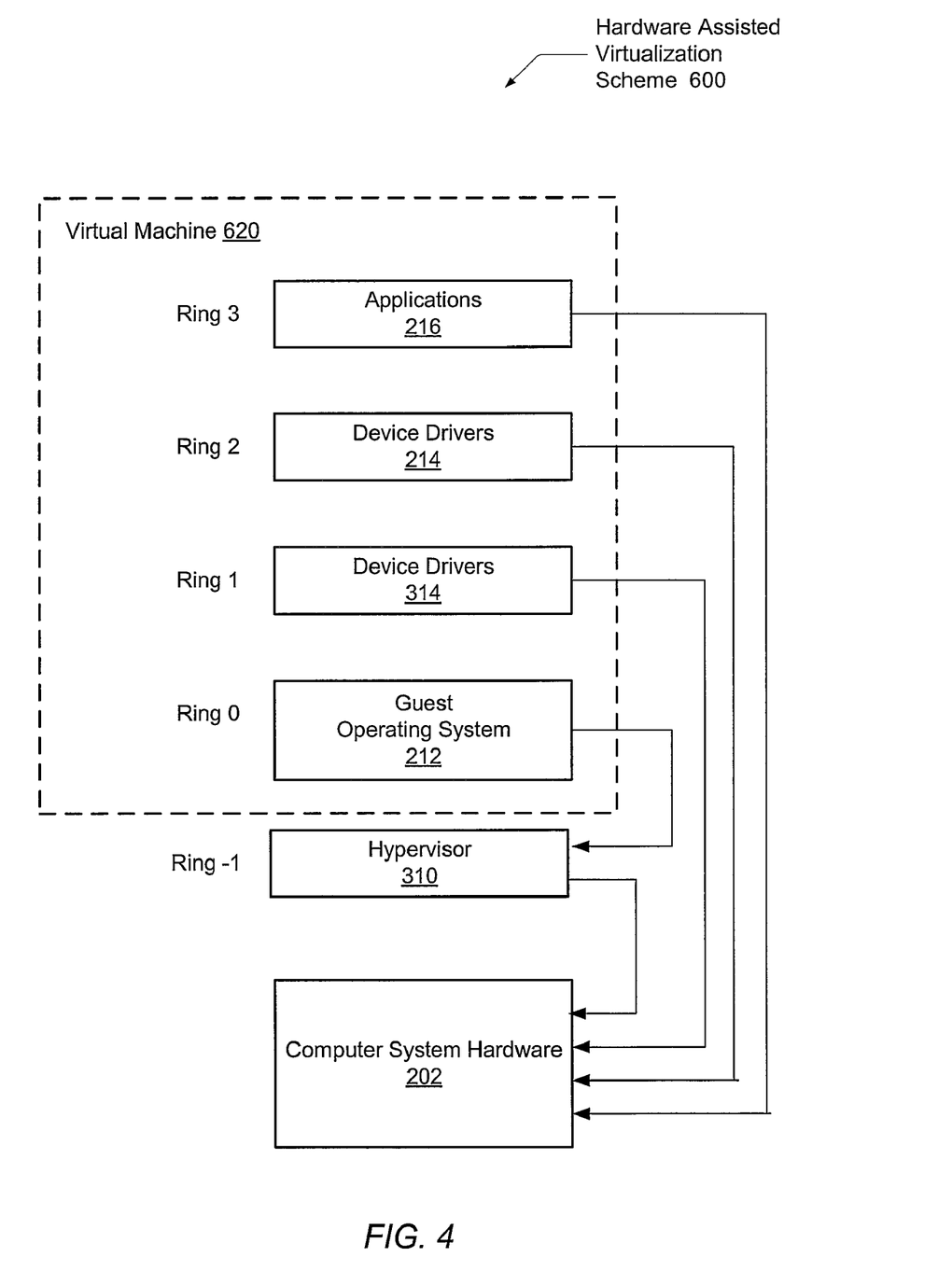
FIG. 4 is a generalized block diagram illustrating one embodiment of a hardware-assisted virtualization scheme.

Turning now to FIG. 4, one embodiment of a hardware assisted virtualization scheme 600 is shown. Circuitry, signals, logic, and computer program instructions corresponding to those in previous figures are numbered accordingly. Virtualization scheme 600 includes a hardware assisted mechanism, wherein hardware vendors are developing new features that target privileged instructions with a new CPU execution mode feature that allows a VMM to run in a new root mode below ring 0. Such a virtualization scheme would resemble the components in FIG. 3, however, paravirtualized guest OS 312 would be replaced with an unmodified guest OS 212. Privileged and sensitive calls are set to automatically trap to the hypervisor 310 removing the need for either binary translation or modification of the guest OS 212. Examples of this virtualization scheme include Intel's Virtualization Technology (VT-x) and AMD's AMD-V.

One of the important attributes of x86 virtualization is guest OSes 212 continue to run in Ring 0 as shown in FIG. 4. In effect, hypervisor 310 runs in Ring −1, or a newly named ring level. For example, Intel refers to this level as level virtual machine extension (vmx) and AMD uses secure virtual machine (svm). There is a lot of activity today with paravirtualized device drivers. These are drivers that know about the hypervisor and have been written to take advantage of the hypervisor's facilities, but are installed in a typical non-paravirtualized OS. Such a mechanism allows unmodified OSes 212, such as Windows XP, to run on x86 hardware that support hardware assisted virtualization, but get many of the performance benefits of paravirtualization.

The performance benefits are realized because drivers, such as disk and network drivers, that do block input/output (I/O) operations have been replaced by drivers that just pass I/O operations to the hypervisor. For instance, VMWare provides drivers to add to Windows XP that interact directly with the VMware ESX infrastructure. The term "paravirtualized driver" thus implies a driver that can potentially be installed in a paravirtualized or fully-virtualized OS (hardware assisted virtualization) and can run in a fully-virtualized OS in a paravirtualized manner.

Figure 5:
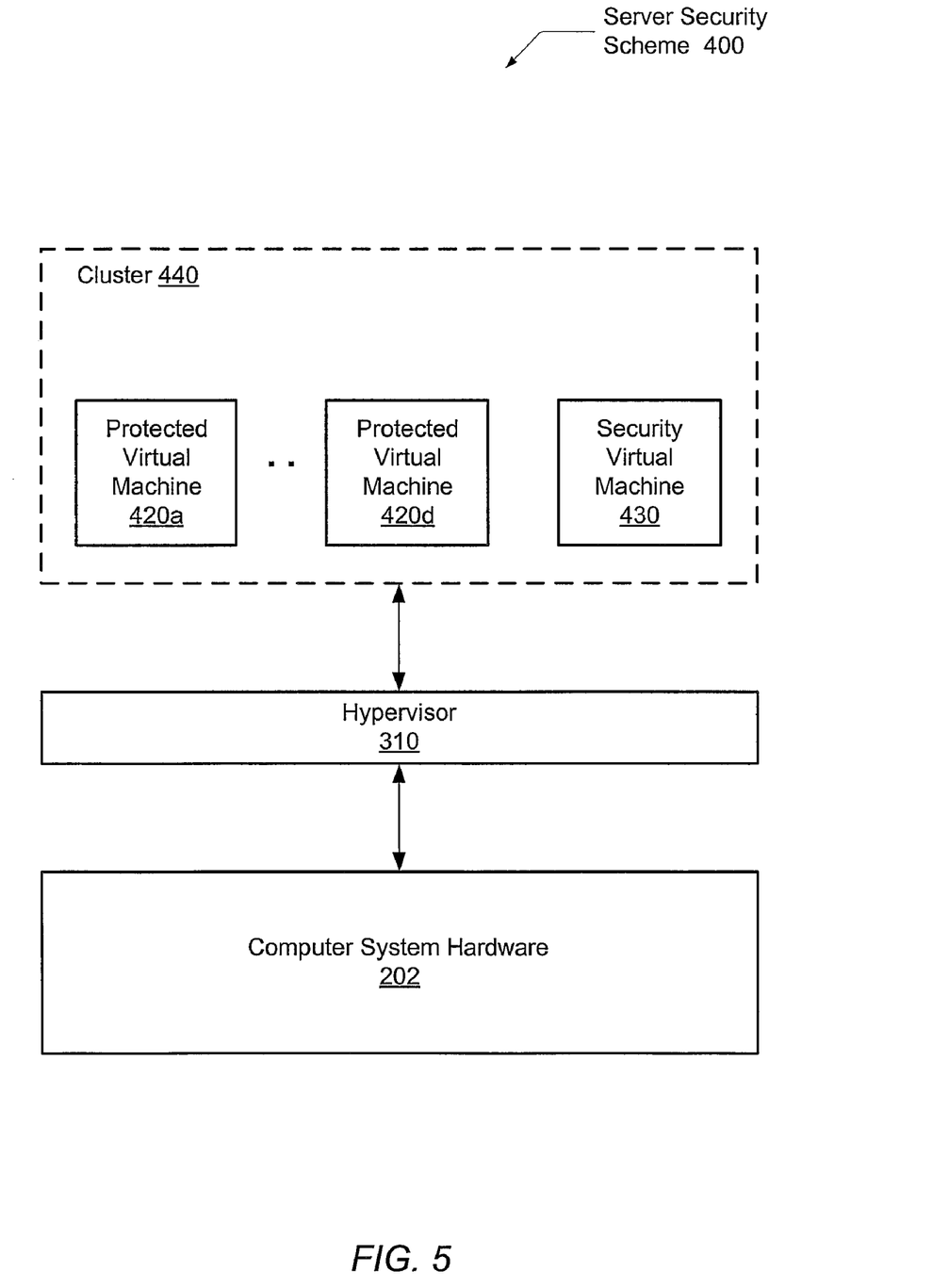
FIG. 5 is a generalized block diagram illustrating one embodiment of a server security scheme.

Referring to FIG. 5, one embodiment of a server security scheme 400 is shown. Circuitry, signals, logic, and computer program instructions corresponding to those in previous figures are numbered accordingly. In one embodiment, a cluster 440 comprises one or more protected VMs 420 and a corresponding security VM 430. Virtual machines 420 and 430 may be structured similarly to VM 320 in FIG. 3 or VM 620 in FIG. 4. Security VM 430 may have access to large databases. Security VM 430 may store and execute security routines such as scanning, or reading, the memories of protected VMs 420 to verify that a malicious rootkit is not attempting unauthorized modifications.

The VM level may be susceptible to malicious rootkits. A rootkit is malware consisting of a program, such as a small driver, or a combination of several programs, or any set of tools, designed to hide the fact that a system has been compromised. Rootkits may be used to gain unauthorized access, such as root access, to a system. An attacker may use a rootkit to replace vital system code, wherein the replacement code is used to hide undesirable processes and associated undesirable files the attacker has installed along with the presence of the rootkit itself. A rootkit is typically intended to seize control of an OS running on the hardware.

Generally speaking, an undesirable process, as part of a rootkit or standalone, may exhibit undesirable behavior such as deleting, copying, modifying and/or encrypting files on a host system; sending documents such as via electronic mail (e-mail); installing a backdoor on a host system; causing applications to execute at a rate different from an expected rate, which may reduce functional system performance, such as noticeably disrupting network traffic on a system; or other.

An undesirable process may or may not be authorized to perform the behaviors which are deemed undesirable. For example, a legitimate, authorized, process may behave in such a manner that is monopolizes a given resource. Depending on the circumstances, the monopolizing behavior may be deemed undesirable. In other cases, an undesirable process may not be authorized to perform the described behavior above. For example, malware is a category of code and/or processes which are unauthorized. In order to detect undesirable behavior by an undesirable process, it may be desired to monitor each associated file operation such as creation, copy, and/or deletion of a file; monitor each interaction with a critical component of an OS such as a registry or other; and monitor each process creation, modification, and termination; each network inbound and outbound communication. Other examples of undesirable process detection mechanisms are possible and are contemplated.

Rootkit binaries may be detected by signature or heuristics based antivirus programs. Rootkit detection may include searching system memory. By monitoring all ingress points for a process as it is invoked, keeping track of imported library calls that may be hooked or redirected to other functions, loading device drivers, and so forth, a rootkit may be detected. This approach may require a large database, although a large database may be supplied by a security virtual machine (VM). Another possible rootkit detection application may scan file system locations and registry hives, determining hidden information from an application programmer's interface (API), a master file table, a directory index, or other, such as determining hooks in APIs, call tables, and function pointers. A registry hive may need to be stored, examination of the C: directory tree for known rootkit sources and signatures may follow, and finally a cursory analysis of the entire C: volume may occur. Other examples of rootkit detection methods are possible and contemplated.

In one embodiment, a small paravirtualized security device driver, or symbiont, may be loaded into each protected VM 420. The symbiont may have access to kernel-level activities within a protected VM 420 and convey this, or related, information to the security VM 430 via a private and secure communication channel, which is a channel that a malicious rootkit may not able to detect. In addition, the security VM 430 may be configured to detect if a symbiont within a protected VM 420 has been compromised (e.g., by a rootkit). Further details are provided below. One or more clusters 440 may be coupled to hypervisor 310 and hardware 202. For example, if there are different classes of VMs on a same physical server, then there may be multiple security VMs, one for each class.

Figure 6:
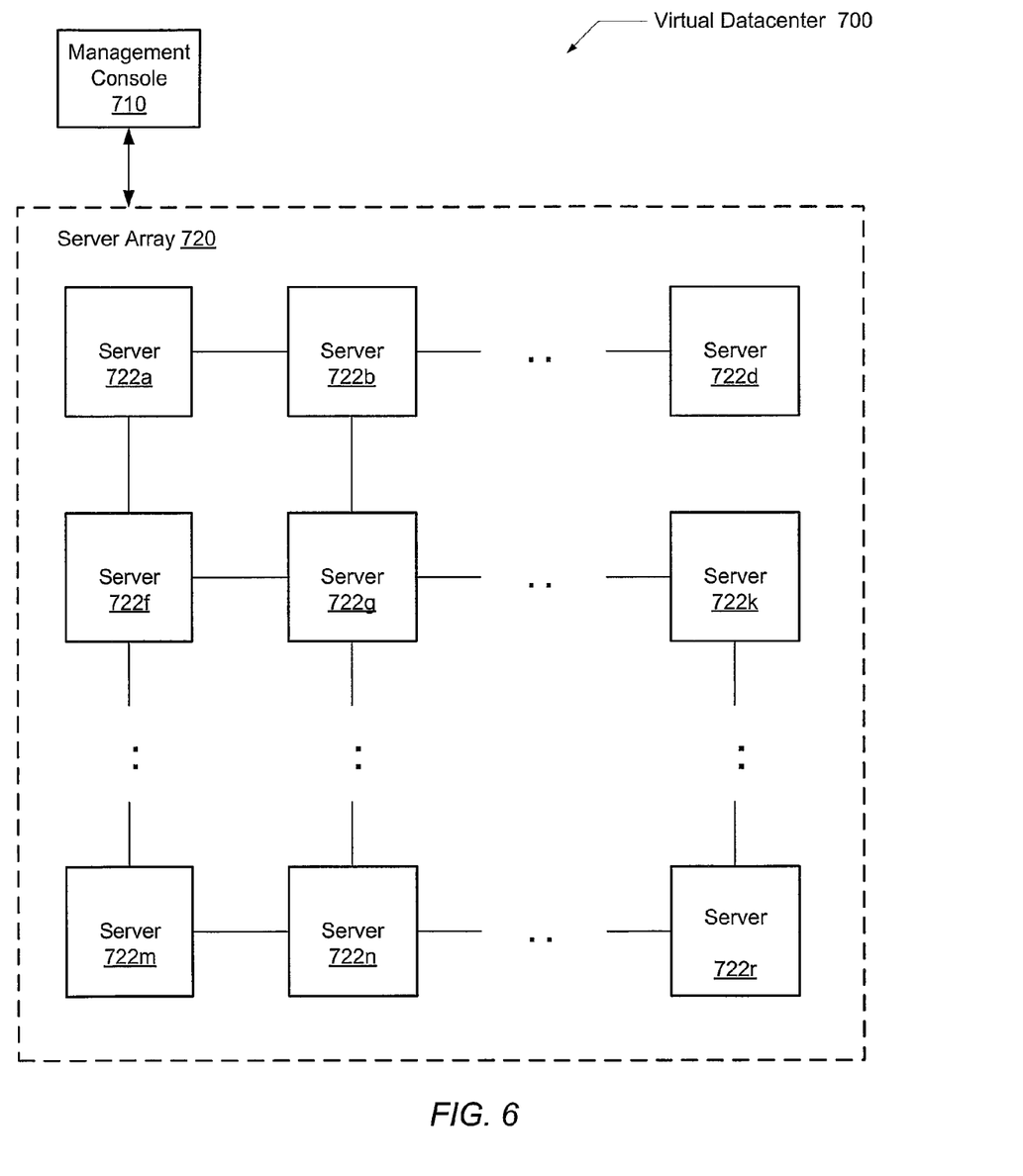
FIG. 6 is a generalized block diagram illustrating one embodiment of a virtual datacenter.

Turning now to FIG. 6, one embodiment of virtual datacenter 700 is shown. As discussed above, the back-end, or security VM 430, supports the symbionts present on a physical machine such as server 722 within server array 720. In one embodiment, server array 720 may be a grid with multiple servers 722, such as 10,000 servers, wherein each server 722 may contain 50-60 virtual machines. Therefore, an automated management system may be desired. Servers 722 may be coupled together by a high-speed network, in one embodiment. Due to migration, a suspected malicious rootkit may move from one server to another within array 720. In such a case, a security VM 430 on a first server, for example, server 722a, may need to convey information to a security VM 430 on a second server, such as server 722b. Multiple security VMs 430 may be used to provide separate security domains, as may occur when multiple companies share the same virtualized datacenter 700, wherein each company desires to manage its own security domain. In this case, security VMs 430 manage a subset of protected VMs 420 on a physical machine that correspond to their security domain.

In one embodiment, security VMs 430 may be implemented so that the overall security system for virtual datacenter 700 is able to rapidly recover from backend failure. For instance, the backend may be implemented as a high-availability (HA) virtual machine if a HA VM is supported by the underlying hypervisor. Security backends may be combined to form a single virtual datacenter-wide platform that links the backends, and thus, provides access to the symbionts. Security backends may be linked in a manner of the distributed nodes of a cluster. This "virtual security cluster" may utilize a single API that may be accessed by security tools, such as a sysadmin graphical user interface (GUI) console to manage the entire security platform. Management console 710 may utilize such a GUI. This API enables control of a single symbiont, if need be, but can also be used to control groups of symbionts. One means to provide this API is for the security backends to elect a "cluster" leader, in the manner of a cluster system such as Symantec Corporation's Veritas Cluster Server (VCS). The current leader would then export the API to management tools.

Figure 7:
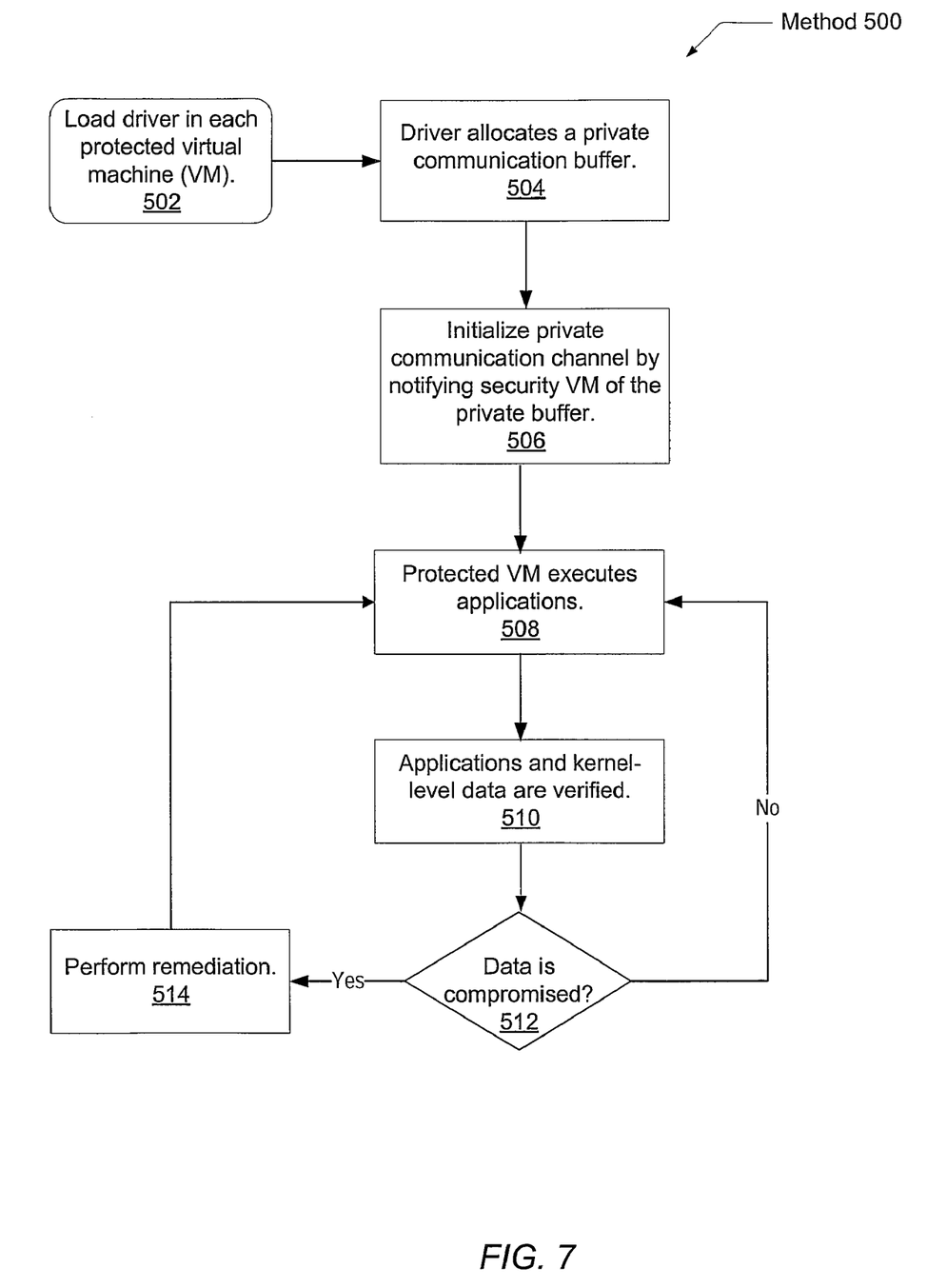
FIG. 7 is a generalized flow diagram illustrating one embodiment of a method for efficient security protocols in a virtualized datacenter environment.

Turning now to FIG. 7, one embodiment of a method 500 for efficient security protocols in a virtualized datacenter environment is illustrated. The components embodied in the computer system described above may generally operate in accordance with method 500. For purposes of discussion, the steps in this embodiment are shown in sequential order. However, some steps may occur in a different order than shown, some steps may be performed concurrently, some steps may be combined with other steps, and some steps may be absent in another embodiment.

In block 502, a paravirtualized security device driver, referred to here as a symbiont, is loaded into the kernel of a protected VM 420. This driver may be a portable kernel code with a common core that is built or compiled for each supported OS or kernel, such Windows or Linux via the use of standard build technology, such as wrapper files, include file preprocessing, and customization.

In one embodiment, a typical loader within a kernel is used to load a symbiont as a typical driver and the kernel is aware of the symbiont. However, the kernel is not aware of the purpose of the symbiont or the actions of the symbiont. A typical loader within a kernel is used to support peripheral devices such as Universal Serial Bus (USB) ports and other. This loader is used to load supporting code and link the supporting code so it is ready for execution. For example, at an appropriate time the loader may find any relevant libraries on disk and add the relevant data from the libraries to a corresponding process's memory space. A loader may record which library routines a program requires and the index names or numbers of the routines in the library. A loader accesses a kernel's symbol table for the insertion of code.

In one embodiment, the symbiont is a normally loadable driver or loadable module. This symbiont could be installed in the OS of the protected VM 420 in the fashion of a normal driver or as part of a VM paravirtualization kit. The symbiont may be configured to monitor security-related behavior of the guest OS. Such behavior may include software process creation and deletion and the loading and unloading of kernel modules. The symbiont has access to high-level activities internal to each protected VM 420. For example, the symbiont is able to inspect all running processes, the files opened by the running processes, the code of the processes, interpret data structures, and perform page inspection.

The symbiont may be written by a user with full knowledge of an external dedicated co-operating security environment that extends the functionality of the hypervisor. Similar to a typical loader, the symbiont may be configured to access a kernel's symbol table for the insertion of code. The symbiont may utilize self-modifying code similar to typical loaders, but without kernel interaction.

This paravirtualized security device driver, the symbiont, may contain a common interface to kernel driver application programming interfaces (APIs) and the kernel itself. This interface may not need to be uniformly supported across all kernels. It may not be a strict abstraction layer that provides a completely similar view of underlying kernels. Rather, the common interface may provides a standard means to navigate a description of the exposed kernel functionality, determine if the kernel supports specific operations, determine the values of default arguments, and so forth.

The symbiont may contain a common set of routines, written for each supported kernel, that provide standard security functions. These functions may include enumerating all software processes, terminating a process, traversing the open sockets of a process, determining the full-pathname of the executable for a process, and so forth. This set of routines may use the interface to the kernel described above and may be written with full knowledge of the kernel internal activities. This common set of routines may include routines configured to store metadata, such as metadata describing software processes and process identifiers (IDs) and kernel metadata, that is subsequently read by a backend comprising a security VM 430. This metadata may include the data type and format of a process, the size of a process, relationship of a process with other processes, the dates and/or timestamps of the creation and modification of a process, identification of a source or creator of a process, the language used, or other. Further, metadata may be stored and subsequently read regarding files and other objects associated with the monitored processes.

The symbiont may also include security logic independent of the underlying kernel. The logic may support, for example, common behavior analysis engines or high-level remediation logic to repair detected security issues. Further details are provided shortly. This component may also contain standard infrastructure, such as the ability to load byte-signatures and filenames relevant to the underlying guest OS of protected VM 420.

The symbiont may act as an agent for extending the capabilities of a corresponding security VM 430, which is further described below. Because a virtual machine may not allow direct outside access of internal data, whether by authorized or unauthorized entities, a semantic gap problem may exist. The symbiont provides a means for a security system to perform high-level semantic introspection within a protected VM 420 and to perform operations in the kernel context of the protected VM 420, such as loading code. In this manner, the semantic gap problem may be reduced or removed.

In addition, the symbiont may include a standard set of paravirtualized-operations referred to herein as "pv-ops". The Pv-ops may abstract the underlying hypervisor and provide an interface used by the rest of the symbiont. The underlying hypervisor may be discovered by the symbiont when the protected VM containing the symbiont calls the symbiont's initialization or load routine. Unlike the kernel driver interface, the pv-ops interface may need to dynamically adapt to use all supported hypervisors. The supported hypervisor may not be selected at compile time, which may occur for the kernel driver interface. Such a need may arise when a protected VM containing the symbiont is stored in an open virtualization format (OVF) file or other image that may be booted under many different hypervisors.

In one embodiment, the pv-ops interface may be implemented via a pointer to an appropriate hypervisor function-table set at initialization. A disadvantage of this technique is that it may not support new hypervisors or hypervisors unknown to the symbiont at build time. In another embodiment, if hypervisor vendors set a single pv-ops interface as a standard for paravirtualized kernels, the symbiont may use such a facility to dynamically load its code to perform the particular hypercalls required by the underlying hypervisor. Therefore, the symbiont may not need to be compiled in advance for all the hypervisors on which it may run.

Within a typical virtual datacenter, a physical server may have 50 to 60 virtual machines (VMs) running on it. However, it may be inefficient to have 50 to 60 copies of security components to detect and remediate the effects of a malicious rootkit. External security may be implemented by a security VM 430, which is a VM dedicated solely to security routines. The security VM 430 may be configured to scan, or read, all memory of a protected VM 420. Scanning this amount of memory may be aided by the fact security VM 430 has a large database. However, without a symbiont loaded into a protected VM 420, the security VM 430 is limited in its capabilities due to the semantic gap problem discussed above. With a loaded symbiont within a protected VM 420, the security VM 430 may be able to receive valuable internal kernel-level information for detection and remediation of security issues.

In addition, a symbiont may itself detect corruption via its own security routines. However, due to its small size and a desire for the symbiont to appear as a typical device driver, the symbiont may have limited security features. In order to compensate for its limited features, the symbiont may be configured to communicate to an external entity, such as an external security VM 430. In such an embodiment, the symbiont may access a kernel's symbol table and pass symbol information to the security VM 430, which has the responsibility of linking code for security measures such as detection and remediation. A communication channel is needed between the symbiont within a protected VM 420 and the security VM 430. And it is desired to maintain this communication channel as private in order that a malicious rootkit is not able to detect it and cause further corruption or attempt to hide from the security VM 430.

In one embodiment, a private security loader that is used to place security checks in a protected VM 420 is split into a front-end (symbiont) and a back-end (security VM 430). Typically, in order to communicate between VMs, a networking stack is utilized. A device driver identifies a corresponding device within its program instructions such as in a function call. For example, the Linux kernel provides a set of APIs to detect a device over the PCI bus. However, the symbiont does not identify a device to be placed on a networking stack or an input/output (I/O) stack. There is no identification made by the symbiont of an upcoming potential communication protocol and no identification made of an external device. Therefore, the communication protocol setup with an external security VM 430 is not readily detectable by a malicious rootkit. A communication channel setup between the symbiont and an external security VM 430 may now be private, since a malicious rootkit may not be able to detect this communication protocol is occurring. This predetermined protocol between the front-end (symbiont) and back-end (security VM) may utilize a small, shared memory, a communication buffer, that the back-end is able to detect.

In block 504, the paravirtualized security device driver, or symbiont, allocates a private communication buffer. In one embodiment, a symbiont residing in a protected VM 420 may allocate pages for a private communication protocol with an external security VM 430. In one embodiment, the symbiont may allocate an input page and an output page for each virtual processor in the protected VM 420. The symbiont may initially fill one or more protocol pages with signed content. Then the symbiont may execute code, such as a return instruction, located in the page, which causes, in block 506, a corresponding security VM 430 to scan and identify the page. In one embodiment, the code may comprise a function call to a location in the page and the function call performs no function, or performs a no-op operation. Subsequent to identifying the page by the security VM 430, the page may be used as a shared communication protocol buffer. No VM-visible interrupts or traps, no I/O packets, no network header information, or other are used during the communication. It is noted that there are no interrupts, traps, or packets as seen inside the VM. However, there may be a hypervisor interrupt or trap caused by the call to the return instruction within the allocated page. This trap may be caused by the real hardware memory management system and the extended x86 virtualization hardware. Therefore, there may be a hypervisor trap, but there is no trap within the VM managed by the kernel in the VM The symbiont may signal new buffer content by, for example, executing the known buffer's internal code (invoking the security VM 430). Likewise, the security VM 430 may write data to selected protocol buffers and then signal the symbiont that it has readied a buffer by writing to specified memory locations, such as variables in symbiont memory or kernel event data structures.

In one embodiment, this private communication channel between the security VM 430 and a symbiont within each protected VM 420, is implemented on top of an underlying Writable xor Executable (W^X) page-level security mechanism. The W^X security mechanism is a security feature present in the OpenBSD operating system. Generally speaking, this mechanism is a memory protection policy whereby pages in a process' address space is either writable or executable, but not both simultaneously.

In block 508, the applications within each protected VM 420 are executing. During the execution of these applications, a security VM 430 may be monitoring protected VMs 420 by inspecting their memory in response to page-level events. The security VM 430 may be configurable to read and write pages of protected VMs 420 and to trap on selected page accesses made by the protected VMs 420. Upon trapping, the security VM 430 may gain control before a protected VM 420 is able to proceed. The W^X mechanism typically traps attempts to execute modified pages that have not yet been scanned. The trap typically calls a scanner to validate the modified page. After this trap is handled, attempts to execute instructions from this page do not again cause traps until the first attempt to execute an instruction within this page after this page has been modified again.

The W^X mechanism enables pages that cause such protected VM 420 traps to be mapped through to the memory of a user-level application process in the security VM 430. This security application can read and write any physical page in the protected VM 420, read and write all the registers within a protected VM 420, and can request virtual-to-physical address translations, via a page table within the protected VM 420. The W^X mechanism does not provide a method to navigate kernel context within protected VMs 420. Rather, the W^X mechanism provides a view only to binary contents of individual code pages. However, as described above, the symbiont is able to overcome this semantic gap problem.

As discussed above, during application execution on the protected VMs 420, a security VM 430 inspects the memory of the protected VMs 420. A corresponding hypervisor may be configured to halt execution on a protected VM 420 when a corresponding program counter (PC) value accesses a predetermined page. The virtual processor may be halted at this point. The security VM 430 may then be used in combination with the symbiont to scan the page and verify the page, or determine any unexpected modifications.

A library of known symbionts, which may be dynamically updated, on the security VM 430 may be used by a security application within the security VM 430 to validate that a symbiont in a protected VM 420 contains unmodified code, or the symbiont has not been compromised by a malicious rootkit. Additionally, in block 510 of method 500, by performing a scan of memory within a protected VM 420, detecting a change in a rate of operations execution, or other, the security VM can detect both if a protected VM or the corresponding symbiont itself is corrupted. Also, a malicious rootkit may attempt to write bad instructions into the communication buffer utilized in the private communication protocol. However, the security VM 430 may be configured to utilize a corresponding program counter (PC) value to inspect the new code and determine if the new code has expected code values. A corresponding check or examination occurs frequently in order to ensure appreciable time does not elapse between checks. The security VM 430 provides instructions to be executed to the protected VM 420 and shortly afterwards inspects the protected VM 420 to determine if the instructions were executed successfully.

Virtual machines are able to relocate from one physical server to another, which involves coordination of page mapping between two corresponding hypervisors. Therefore, a malicious rootkit, likewise, may relocate from one physical server to another. Since data infrastructures can change, a security VM 430 may need to update a symbiont within a protected VM 420 via the private communication protocol. The security VM 430 may be able to halt a symbiont, unload previously executing code, and load new code. The security VM 430 is configured to detect alterations to the symbiont and alterations to the communication buffer. If this detection occurs, the security VM can restart the security steps with a new symbiont.

If data is found to be compromised (conditional block 512), such as the security VM 430 detects unexpected changes to locations in memory in a protected VM 420 (communication buffer, the symbiont itself, particular pages, or other), then the security VM 430 performs remediation in block 514. The remediation steps may include rewriting code to be executed by the symbiont, replacing the symbiont and restarting the security steps, or other. In addition, the symbiont may comprise some limited security features that detect a malicious process and the symbion may be configured to kill this process without the aid of the security VM 430. Otherwise, control flow of method 500 returns to block 508.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
   one or more virtual machines (VMs) executing in a computing device;
   a security VM coupled to the one or more VMs; and
   a device driver loaded into at least one VM of the one or more VMs, wherein the device driver is configured to:
      monitor kernel-level activities of a guest OS of the at least one VM;
      cause metadata corresponding to the monitored kernel-level activities to be stored; and
      provide an indication that said metadata has been stored;
   wherein, in response to detecting said indication, the security VM is configured to:
      read said metadata;
      detect an undesirable process within the at least one VM, based at least in part on said metadata;
      convey a first security computer program to the device driver within one of the VMs to be loaded into the kernel;
      halt execution of the device driver; and
      convey a second security program to the device driver to replace the first security program.

2. The system as recited in claim 1, wherein said kernel-level activities include at least one of the following: creation of running processes, listing files opened by the running processes, listing code and data structures of the running processes, killing of the running processes, and storing kernel symbol table values.

3. The system as recited in claim 2, wherein the device driver having no corresponding device is further configured to:
   allocate memory within said at least one VM for storage of at least the metadata; and
   indicate the location of the memory to the security VM.

4. The system as recited in claim 1, wherein said device driver is further configured to kill an undesirable process providing predetermined undesirable behavior, in response to detecting the undesirable process.

5. The system as recited in claim 1, wherein said security VM is further configured to detect a malicious rootkit.

6. The system as recited in claim 1, wherein said indication comprises execution of a return instruction located in the memory by the device driver.

7. The method as recited in claim 1, wherein said conveying information between the device driver and the security VM is implemented on top of an underlying Writable xor Executable (W^X) page-level protection policy.

8. A method comprising:
   monitoring kernel-level activities of a guest operating system (OS) of at least one virtual machine (VM) of one or more VMs in a computing device; and
   storing metadata corresponding to the monitored kernel-level activities;
   providing an indication that said metadata has been stored;
   in response to detecting said indication, reading said metadata;
   detecting an undesirable process within the at least one VM, based at least in part on said metadata;
   conveying a first security computer program to the device driver within one of the protected VMs to be loaded into the kernel;
   halting execution of the device driver; and
   conveying a second security program to the device driver to replace the first security program.

9. The method as recited in claim 8, wherein said kernel-level activities include at least one of the following: creation of running processes, listing files opened by the running processes, listing code and data structures of the running processes, killing of the running processes, and storing kernel symbol table values.

10. The method as recited in claim 9 further comprising:
    allocating memory within said at least one VM for storage of at least the metadata; and
    indicating the location of the memory to a security VM coupled to coupled to said one or more VMs.

11. The method as recited in claim 8, further comprising killing an undesirable process, by the device driver, in response to detecting the undesirable process.

12. The method as recited in claim 8 further comprising detecting a malicious rootkit.

13. The method as recited in claim 8, wherein said indication comprises execution of a return instruction located in the memory by the device driver.

14. The method as recited in claim 8, wherein said conveying information between the device driver and the security VM is implemented on top of an underlying Writable xor Executable (W^X) page-level protection policy.

15. A non-transitory computer readable storage medium storing program instructions operable to perform security routines on virtual machines, wherein the program instructions are executable to:
   monitor kernel-level activities of a guest operating system (OS)) of at least one virtual machine (VM) of one or more VMs; and
   store metadata corresponding to the monitored kernel-level activities;
   provide an indication that said metadata has been stored;
   in response to detecting said indication, read said metadata;
   detect an undesirable process within the at least one VM, based at least in part on said metadata;
   convey a first security computer program to the device driver within one of the protected VMs to be loaded into the kernel;

halt execution of the device driver; and
convey a second security program to the device driver to replace the first security program.

16. The storage medium as recited in claim 15, wherein the program instructions are further executable to:
   allocate a memory within said at least one VM for storage of at least the metadata; and
   indicate the location of the memory to a security VM coupled to coupled to said one or more VMs.

17. The storage medium as recited in claim 15, wherein said kernel-level activities include at least one of the following: creation of running processes, listing files opened by the running processes, listing code and data structures of the running processes, killing of the running processes, and storing kernel symbol table values.

* * * * *